(12) United States Patent
Keller et al.

(10) Patent No.: US 7,079,981 B2
(45) Date of Patent: Jul. 18, 2006

(54) SYSTEM AND METHOD FOR DIAGNOSTIC ANALYSIS OF DELIVERY SERVICES

(75) Inventors: John J. Keller, Washington, DC (US); Pat V. Laffey, Washington, DC (US); Tom G. Martin, Washington, DC (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/932,051

(22) Filed: Sep. 2, 2004

(65) Prior Publication Data

US 2005/0182600 A1 Aug. 18, 2005

Related U.S. Application Data

(60) Provisional application No. 60/500,258, filed on Sep. 5, 2003.

(51) Int. Cl.
*G06F 19/00* (2006.01)
(52) U.S. Cl. .......................... 702/183; 714/25
(58) Field of Classification Search ............... 702/182, 702/183–185, 188–189, 179; 700/115, 119, 700/229, 243; 382/101; 714/2, 25, 47
See application file for complete search history.

(56) References Cited

U.S. PATENT DOCUMENTS

| 6,522,948 B1* | 2/2003 | Benneweis .................. 700/243 |
| 6,697,500 B1* | 2/2004 | Woolston et al. ........... 382/101 |
| 2003/0009254 A1* | 1/2003 | Carlson et al. ............. 700/115 |
| 2004/0030604 A1* | 2/2004 | Young .......................... 705/26 |

OTHER PUBLICATIONS

International Search Report and Written Opinion of the International Searching Authority Mailing Date Apr. 15, 2005.

* cited by examiner

*Primary Examiner*—Edward Raymond
(74) *Attorney, Agent, or Firm*—Finnegan, Henderson, Farabow, Garrett & Dunner, LLP

(57) ABSTRACT

A method of analyzing the operation of a delivery system. The method includes: determining a seeding plan; placing a seed piece into the delivery system; tracking the seed piece through the delivery system to generate tracking data; storing the tracking data in a central repository; and analyzing the tracking data to determine one or more faults.

21 Claims, 15 Drawing Sheets

/1100

DENVER ADC ORIGINATING SUMMARY REPORT
March 13, 2004 - March 22, 2004

[ Excel ]     [ Print ]

Service Threshold 93%

| DESTINATION | TOTAL | ON TIME | % ON TIME | SERVICE COMMITMENT FAILURES | ERROR ANALYSIS | | | | | |
|---|---|---|---|---|---|---|---|---|---|---|
| | | | | | TOTAL ERRORS | ORIGIN PLANT | ENROUTE | INTERIM PLANT | DEST PLANT | UNKNOWN |
| Harrisburg | 24 | 14 | 58.33% | 10 | 17 | 8 | 2 | 3 | 3 | 1 |
| 171 | 15 | 10 | 66.67% | 5 | 8 | 2 | 1 | 1 | 2 | 2 |
| 172 | 9 | 4 | 44.44% | 5 | 15 | 3 | 3 | 5 | 3 | 1 |
| 17201 | 1 | 0 | 0.00% | 1 | 2 | 0 | 2 | 0 | 0 | 0 |
| 17211 | 1 | 0 | 0.00% | 1 | 5 | 2 | 0 | 1 | 1 | 1 |
| 17236 | 1 | 0 | 0.00% | 1 | 1 | 1 | 0 | 0 | 0 | 0 |
| 17238 | 1 | 1 | 100.00% | 0 | 0 | 0 | 0 | 0 | 0 | 0 |
| 17240 | 1 | 1 | 100.00% | 0 | 0 | 0 | 0 | 0 | 0 | 0 |
| 17251 | 1 | 1 | 100.00% | 0 | 0 | 0 | 0 | 0 | 0 | 0 |
| 17257 | 2 | 0 | 0.00% | 2 | 7 | 0 | 1 | 3 | 2 | 1 |
| 17260 | 1 | 1 | 100.00% | 0 | 0 | 0 | 0 | 0 | 0 | 0 |
| | | | | | | | | | | |
| Chicago | 10 | 9 | 90.00% | 1 | (etc) | | | | | |
| Sacramento | 25 | 23 | 92.00% | 2 | | | | | | |

IF % on time in "D" column equals XX% then bold green
IF % on time in "D" column Greater than XX% but less than XX% then bold red
IF % on time in "D" column Greater than XX% but less than XX% then bold black

FIG. 11

SYSTEM AND METHOD FOR DIAGNOSTIC ANALYSIS OF DELIVERY SERVICES

RELATED APPLICATIONS

The application claims the benefit of priority from provisional U.S. Patent Application Ser. No. 60/500,258, entitled "System and Method for Tracking and Tracing Mail Flow," filed Sep. 5, 2003, the disclosure of which is expressly incorporated herein by reference.

TECHNICAL FIELD

The invention relates to the field of delivery services, and more specifically, a system for and method diagnostic analysis of delivery services. More particularly, the principles consistent with the present invention may be used to perform performance measurements and diagnostic analysis on mail processes by tracking and tracing the flow of mail.

BACKGROUND

Since the 1980's, the watchwords of this country's businesses have been "continuous improvement." Continuous improvement of business processes is not possible without performance measures. Delivery service providers, such as the United States Postal Service™ ("USPS™"), strive for continuous improvement of its performance in handling of mail, thus requiring performance measures.

Systems are known to potentially measure the performance of its internal mail handling. Tracking and tracing systems, intended for limited use by customers and more advanced use by internal organization, are already in place and capable of tracking mail throughout the USPS™ mailing system. For example, bar codes, such as PLANET™ Codes, affixed to mail pieces provide unique identifiers of a given mail piece. In addition, an enhanced PLANET™ Code, known as a "4-STATE™" bar code may also be used. The 4-STATE™ may offer the capability of embedding twice as much information in the bar code as the current PLANET™ Code. As the uniquely identified mail piece travels through the service provider system, mail processing equipment and scanners may track the uniquely identified mail piece, utilizing its bar code, and upload this tracking information to a central system, such as an Electronic Post Office ("EPO").

The Confirm Service is a USPS™ system designed to provide tracking and tracing information to postal customers and internal organizations. Some operations of the USPS™ have endeavored to create local systems to seed mail and track the mail with Confirm; however, such localized systems fail to provide a systematic, consistent, nationwide system for measuring performance and recommending improvements. Performance measures must be consistently applied across an organization in order to accurately measure performance and improvement. In addition, neither the local systems nor the Confirm system provide reporting capability to drill down into reports to determine causes of performance breakdowns.

The present invention is designed to address one or more of the above problems.

SUMMARY

Consistent with the present invention, a method of analyzing the operation of a delivery system is provided. The method includes: determining a seeding plan; placing a seed piece into the delivery system; tracking the seed piece through the delivery system to generate tracking data; storing the tracking data in a central repository; and analyzing the tracking data to determine one or more faults.

Consistent with another aspect of the present invention, a system is provided for analyzing the operation of a delivery system. The system comprises memory and a processor coupled to the memory. The processor is operable to: determine a seeding plan; place a seed piece into the delivery system; track the seed piece through the delivery system to generate tracking data; store the tracking data in a central repository; and analyze the tracking data to determine one or more faults.

Consistent with another aspect of the present invention, computer-readable medium on which is stored a set of instructions for analyzing the operation of a delivery system is provided. When executed, the instructions perform stages for analyzing the operation of a delivery system. The instructions at execution: determine a seeding plan; place a seed piece into the delivery system; track the seed piece through the delivery system to generate tracking data; store the tracking data in a central repository; and analyze the tracking data to determine one or more faults.

BRIEF DESCRIPTION OF THE DRAWINGS

The accompanying drawings, which are incorporated in and constitute a part of this specification, illustrate a system consistent with the invention and, together with the description, serve to explain the principles of the invention.

FIG. 11 illustrates a summary report consistent with the present invention.

DETAILED DESCRIPTION

Reference will now be made in detail to the present exemplary embodiments consistent with the invention, examples of which are illustrated in the accompanying drawings. Wherever possible, the same reference numbers will be used throughout the drawings to refer to the same or like parts.

Consistent with the principles of the present invention, a mailing system operator develops a seeding plan for measuring the performance of mail delivery between a first region and a second region. The mailing system operator may place one or more seed pieces of mail into the mailing system (a process known as induction). The seed pieces may be marked with a unique identifier, such as a bar code or PLANET™ Code, that may be machine-readable. The seed pieces may be given to a mail process operator who re-runs the mail through a bar code sorting mail processing equipment. This is known as induction or "Start the Clock." "Start the Clock" may also be indicated as the first scan by a piece of mail processing equipment (MPE). As the seed piece travels through the mailing system, mail processing equipment may scan the unique identifier of the seed piece, logging a processing equipment identifier, date, and time. At a final MPE, the last scanning and logging may take place, creating a "Stop the Clock" event. As the preceding data is logged, it may be uploaded to a central repository, for example an Electronic Post Office (EPO), for storage. Utilizing the stored data, analysis of the seed piece may be performed and reports may be generated of the time it took for the processing of the seed piece through the mail system. Reports may be broken down by various criteria, for example, geographical area.

Utilizing the stored data, faults may be found in the system and recommendations provided. Utilizing a stored knowledge base developed with input from experienced personnel, the system may: identify faults in the system, such as delays at processing facilities or incomplete deliveries; access the stored knowledge base; and identify improvements to the system. Faults may be placed in three general categories: cycle faults; recycle faults; and sortation faults. Cycle faults are faults indicating processing times in excess of nominal values; for example, a mail piece taking too long between scans at successive MPEs. Recycle faults occur where mail pieces are repeatedly processed by the same MPE. Sortation faults may occur, for example, where mailhandlers improperly stage incoming mail for a sort plan operation. Once faults are identified, the system may access the stored knowledge base for an entry related to the identified fault. The stored knowledge base may return one or more recommended corrections.

Figure 1:
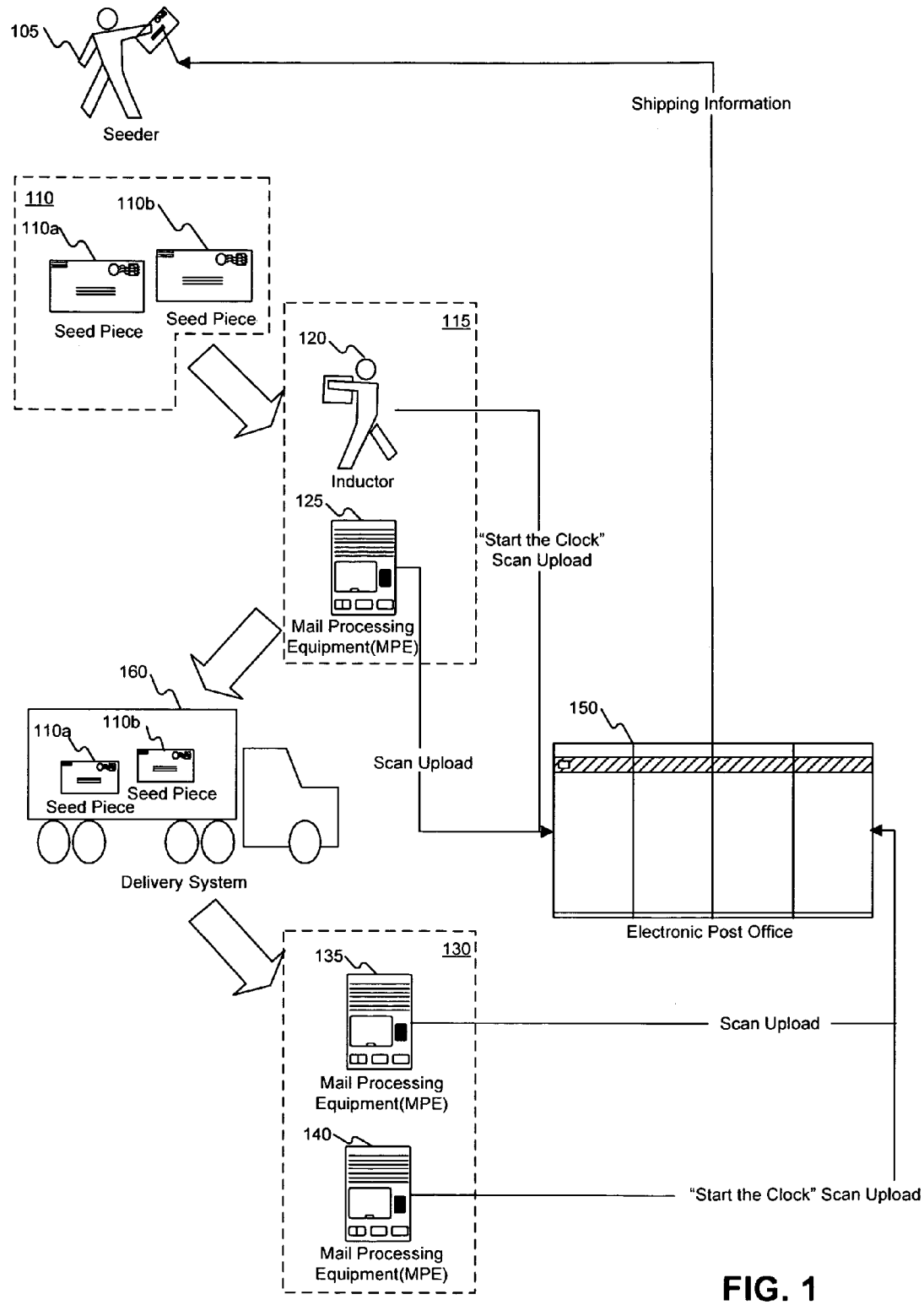
FIG. 1 is an illustration of a system consistent with the present invention in its operating environment.

FIG. 1 is an illustration of a system consistent with the present invention in its operating environment. A mail seeder 105 develops a mail seeding plan for a mailing system. The mail seeding plan may seed mail, for example: from a first plant to a second plant; over a one-day delivery route; over a two-day delivery route; over a three-day delivery route; from an origin to a destination of an origin/destination pair ("OND pair"); through select facilities based on a need to test systems within the facilities; to one or more destinations within an area; from a first plant to every other plant in the mailing system; from and to a user defined list of pairs; or from an origin to a plurality of destinations based on historical volume. Seeding plans will be more fully described later with respect to FIG. 5.

Mail seeder 105, such as an employee of a mailing system, places one or more mail seed pieces 110a, 110b into the mailing system, possibly within a shipment 110. Shipment 110 may have a unique shipment identifier to identify the seeding name. Based on the seeding plan, mail seeder 105 may mail seed pieces 110a, 110b from an origination to a destination, for example from an origin processing and distribution center ("P&DC") 115 to a destination P&DC 130. Seeding plans are not limited to P&DC's, but may also be from or to, for example, a processing and distribution facility ("P&DF").

Each origination and destination point may be assigned a unique subscriber identifier. The subscriber identifier may be embedded into a PLANET™ Code (discussed further below). The subscriber identifier may take the form "99XYY," where "99" identifies the mailing piece as part of a seeding operation, X may be a digit from 0 to 9 indicating a geographic area, and YY may be a code from 00 to 99 indicating a P&DC or P&DF within the geographic region. Those skilled in the art will appreciate that the subscriber identifier may vary or be enlarged to encompass a larger number of origination and destination locations.

Mail seed pieces 110a, 110b may be addressed by hand or computer printed. Each mail seed piece 110a, 110b contains a unique mail identifier, for example a PLANET™ Code. PLANET™ Codes may be applied to individual mailings or individual mail pieces, where the application is directly on the mail piece or through a label on the mail piece. PLANET™ Codes are described more fully with respect to FIG. 4.

The unique mail identifier uniquely identifies the mail seed piece 110a, 110b, where the identifier remains unique for at least a period long enough for the mail seed piece 110a, 110b to travel from the origin P&DC 115 to the destination P&DC 130.

Seeder 105 introduces seed pieces 110a, 110b into, for example, a culling area at an induction point at an origin P&DC 115. A postal worker, such as inductor 120, may scan seed pieces 110a, 110b utilizing a scanner, such as an MDCD, or the seed piece may initially be scanned by an MPE. The scanner may scan the unique mail identifier on seed pieces 110a, 110b, signaling induction has taken place. The scanner may record scanning and equipment information, such as the date, time, the unique mail identifier (e.g., a PLANET™ Code), a mail processing code, POSTNET codes, and an equipment identifier that uniquely identifies the MPE or scanner. Mail processing codes may include information about the nature of the operation of the equipment utilizing the scanner. These mail processing codes may follow the general guideline that outgoing MPE comprise a two-digit code ending in a "1," or a "2" while incoming MPE comprise a two-digit code ending in a "3," "4," or "5."

The scanning and equipment information may be uploaded, either in real-time or at a later point in time, to a central repository 150. Central repository 150 may store the scanning and equipment information as a record in a database, where the record is associated with seed pieces 110a, 110b based on the unique mail identifier. The record may also be associated with the unique shipment identifier.

Typically, origin 115 may have multiple pieces of mail processing equipment 125 that handle mail pieces 110a, 110b as they travel through origin facility 115. These may include, for example, canceling machines, optical character reading machines, and barcode sorting machines. Each MPE 125 may have a unique equipment identifier associated with it, as previously described. Some or all of MPE 125 may have scanning capabilities to scan the unique mail identifier and upload scanning and equipment information to central repository 150. For example, an origin P&DC 115 may initially have an MPE canceling unit, a 010 unit, that may detect a stamp on the seed piece 110a, 110b, cancel the stamp, and spray a code on seed piece 110a, 110b that includes a time that the seed piece 110a, 110b was processed by the unit. While some 010 units may not have scanning capability, the 010 unit may have a scanner to read the unique mail identifier and upload scanning and equipment information to central repository 150.

Following processing by the canceling machine, an optical character reading machine ("OCR") type of MPE 125 may read the hand scripted address and apply a POSTNET code to the seed piece 110a, 110b. Once again, the OCR type MPE 125 may have a scanner to read the unique mail identifier and upload scanning and equipment information to central repository 150.

Following OCR, a barcode sorting MPE 125 may sort the seed pieces 110a, 110b, scan seed pieces 110a, 110b and upload the scanning and equipment information to central repository 150.

Following sorting operations, seed pieces 110a, 110b travel through delivery system 160 to destination 130, for example a destination P&DC. Scanning operations may occur throughout delivery system 160.

At destination 130, one or more further MPE 135 may further process seed pieces 110a, 110b, scan seed pieces 110a, 110b, and upload the scanning and equipment information to central repository 150. Specific MPE 140 generate a MOD operation that serves as a criteria for a "Stop the Clock" scan that denotes seed pieces 110a, 110b have reached the end of processing. MPE 140 may upload this scanning and equipment information to the central repository 150.

During or after processing the seed pieces 110a, 110b, performance analysis and diagnostic analysis may occur. Performance analysis may measure the time lapse during or between mail processing operations and provide a wide variety of reporting options. For example, reporting may be broken down by type of mailing, for example: FIM (Facing Identification Mark)—business reply type mail; script—hand addressed mail; machine printed; penalty—government agency account type mail; or, metered—mail metered on a customer's machine. Reports may also be generated by region type, for example: national, area, cluster, trouble pair, from a first plant to a second plant; over a two day delivery route; over a three day delivery route; from an origin to a destination of an origin/destination pair ("OND pair"); through select facilities based on a need to test systems within the facilities; to one or more destinations within an area; from a first plant to every other plant in the mailing system; from and to a user defined list of pairs; or from an origin to a plurality of destinations based on historical volume.

In addition, reports may be grouped by seeding names. Reports may be generated by date or day of the week; for example, a report of transit times for seedings that originated on Monday or the last day of the month.

Reports may be generated based on combined origin area. This report may be based on a range of PLANET™ Codes and a date range. This report may illustrate, for example: the total number of seed pieces and the number of seed pieces that fail to be processed in an expected amount of time; a time measure for each piece of the time from the first scan at an origination to a first scan at a destination; detailed listings of all scans for each seed piece.

As has been illustrated, given the data set in the central repository 150, a wide variety of reports may be generated. Those skilled in the art will appreciate that reports and reporting features may be varied, mixed, and matched. Users may designate the formats and data displays of reports. Reports may be exported, for example, or downloaded to spreadsheets and external databases. All reporting options may be generated, displayed, and downloaded over network based systems, such as the Internet, for example, using a browser. In addition, reports may offer "drill down" features to permit more detailed reports of particular MPE's or P&DC's for example.

Utilizing the wealth of data accumulated in central repository 150, diagnostic analysis may be performed. For example, slow delivery times may result from delivery system problems, poor MPE performance, or poor sort schemes. The data in a knowledge base in the central repository may be consulted to examine consistent troubles within the mailing system, and the knowledge base may recommend improvements based on heuristic problem solving techniques. A database of recommendations within the knowledge base may be consulted within central repository 150 to match against noted performance deficiencies to generate recommendations. By analyzing data in central repository 150, critical process flows may be determined and highlighted. For example, seed pieces may stay at one particular facility for an extended period of time, a cycle fault, highlighting the need to improve that facility. For another example, seed pieces may be processed by the same MPE multiple times, a recycle fault, denoting a problem with that MPE.

In addition, predictive modeling may be performed based on the recorded data. As those skilled in the art will appreciate, predictive modeling may permit an operator to enter one or more "what if" scenarios into a predictive modeling system on a system such as the central repository. The predictive modeling system may play out these scenarios using the seed piece data accumulated in central repository 150. For example, predictive modeling may be able to forecast transit times should changes, improvements, or repairs be made to existing MPE. Or, predictive modeling may be performed based on changes in mail handling procedures.

Figure 2:
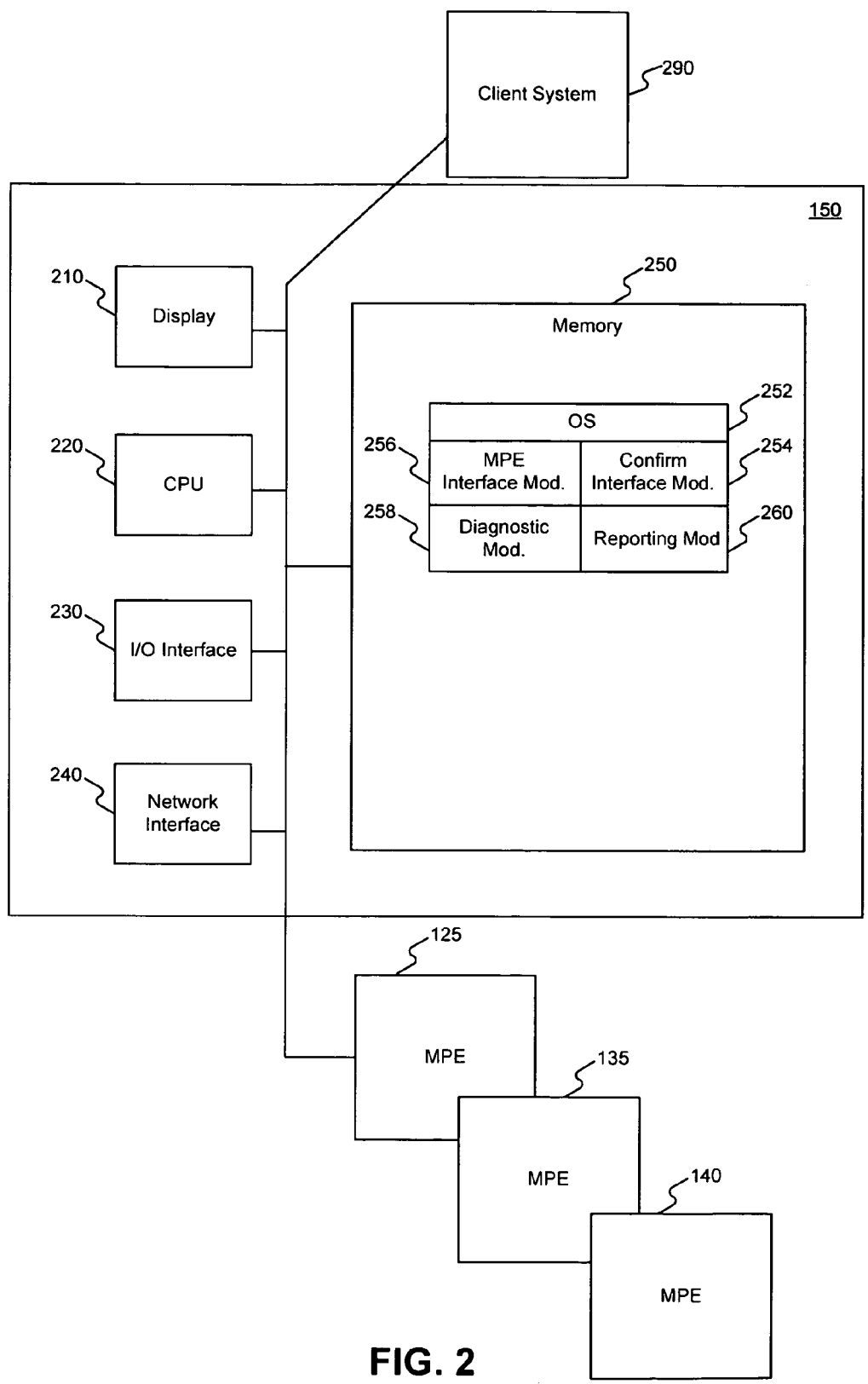
FIG. 2 is a system diagram of components utilized with an Electronic Post Office consistent with the present invention.

FIG. 2 is a block diagram of a central repository 150 consistent with the present invention. As illustrated in FIG. 2, a system environment of a central repository 150 may include a display 210, a central processing unit 220, an input/output interface 230, a network interface 240, and a memory device 250 coupled together by a bus. Central repository 150 is adapted to include the functionality and computing capabilities necessary to implement the described tracking and tracing, reporting, and diagnostic functions of central repository 150 and to access, read, and write to client system 290, e.g. a personal computer or other processing device for accessing information from and providing information to central repository 150. The input, output, and monitoring of central repository 150 may be provided on display 210 for viewing.

As shown in FIG. 2, central repository 150 may comprise a PC, a mainframe computer, or other appropriate processing device for performing various functions and operations consistent with the invention. Central repository 150 may be implemented, for example, by a general purpose computer selectively activated or reconfigured by a computer program stored in the computer, or may be a specially constructed computing platform for carrying-out the features and operations of the present invention. Central repository 150 may also be implemented or provided with a wide variety of components or subsystems including, for example, one or more of the following: one or more central processing units 220, a co-processor, memory device 250, registers, and other data processing devices and subsystems. Central repository 150 may also communicate or transfer scanning and equipment information, tracking information, reports, and diagnostic analysis via I/O interface 230 and/or network interface 240 through the use of direct connections or communication links to other elements of the present invention. For example, a firewall in network interface 240 prevents access to the platform by unpermitted outside sources.

Alternatively, communication within central repository 150 can be achieved through the use of a network architecture (not shown). In the alternative embodiment (not shown), the network architecture may comprise, alone or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, central repository 150 may be located in the same location or at a geographically distant location from systems 125, 135, 140, and 290.

I/O interface 230 of the system environment shown in FIG. 2 may be implemented with a wide variety of devices to receive and/or provide the data to and from central repository 150. I/O interface 230 may include an input device, a storage device, and/or a network. The input device may include a keyboard, a mouse, a disk drive, video camera, magnetic card reader, or any other suitable input device for providing data to central repository 150.

Network interface 240 may be connected to a network, such as a Wide Area Network, a Local Area Network, or the Internet for providing read/write access to records.

Memory device 250 may be implemented with various forms of memory or storage devices, such as read-only memory (ROM) devices and random access memory (RAM) devices. Memory device 250 may also include a memory tape or disk drive for reading and providing records on a storage tape or disk as input to central repository 150. Memory device 250 may comprise computer instructions forming: an operating system 252; a Confirm Interface Module 254 for reading, writing, and updating shipment information and tracking information to the Confirm system; an MPE Interface Module 256 for reading scanning and equipment information from MPE's; a Diagnostic Module 258 for performing diagnostic analysis; and a Reporting Module 260 for generating reports from the scanning and equipment information stored in the client system 290.

Figure 3:
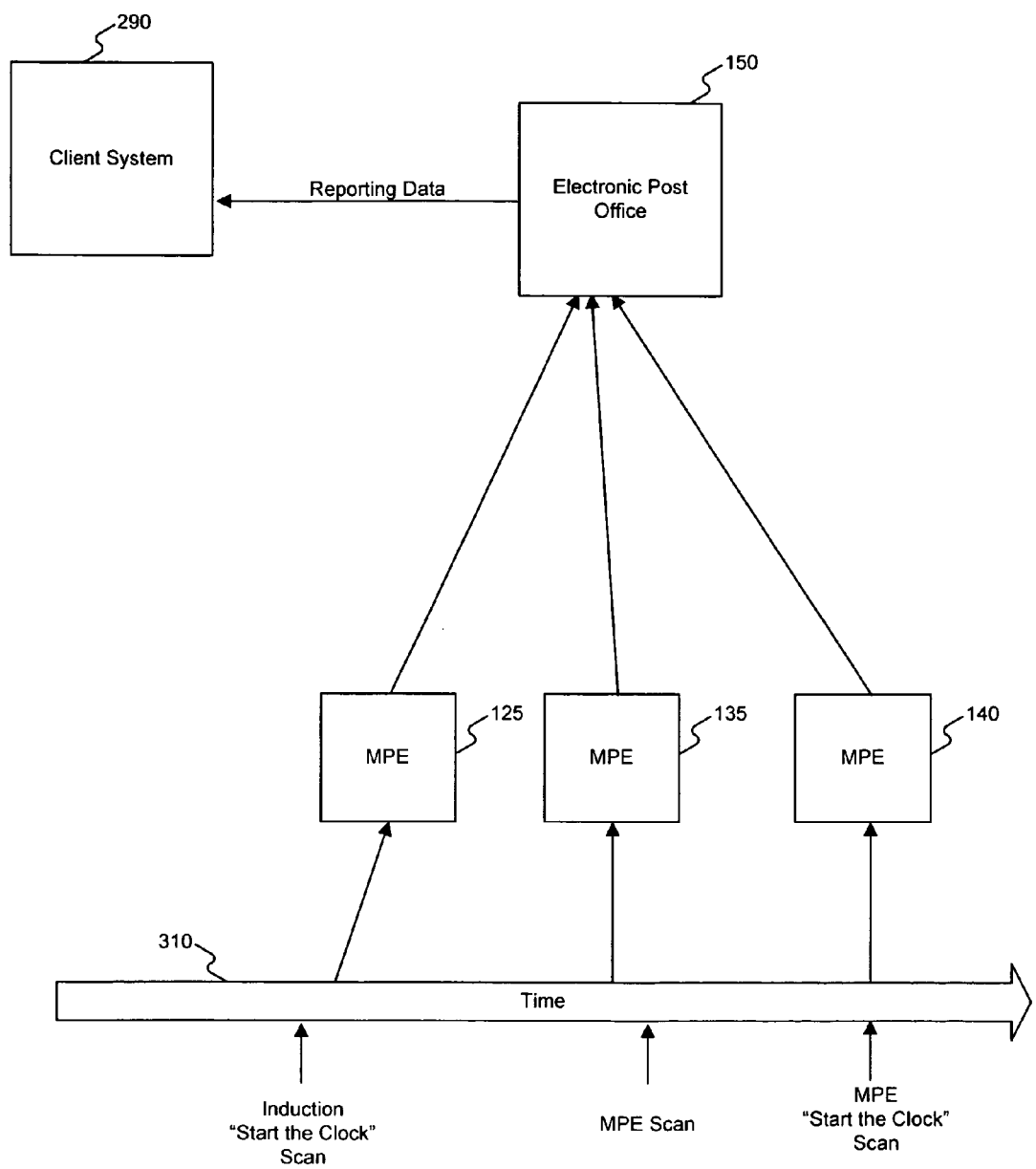
FIG. 3 is a process flow diagram consistent with the present invention.

FIG. 3 is a process flow diagram consistent with the present invention. A Client System 290, such as a database server, receives scan data from central repository 150. The scan data may be used to group one or morescans related to a seed piece for reporting and diagnostic purposes.

Scan data transmitted to the client system 290 may be stored by the central repository 150. Reporting and diagnostic data is then pulled from client system 290 and made available to one or more end user's via access terminals, for example a desktop computer.

Timeline 310 represents the progress of mail seed pieces 110a, 110b through the mailing system. At the time of actual induction, mail processing equipment scan the coded representation of the unique mail identifier, e.g. PLANET™ Code, and upload the information into central repository 150. Central repository 150 may store the uploaded scanning and equipment information in client system 290, associating the uploaded information with the unique mail identifier.

As seed pieces 110a, 110b are processed through the mail system, one or more MPE 125–140 scan the seed pieces and upload scanning and equipment information to central repository 150 for storage and sending to client system 290. At the final MPE 140 (a "Stop the Clock" scan), scanning and equipment information may be uploaded to central repository 150 for storage in client system 290, denoting the final processing step of the mailing system.

At the end of this time-line, or any time during this processing, predictive modeling may occur based on data received from the various MPE. Utilizing the stored data, faults may be found in the system and recommendations provided. Utilizing a stored knowledge base developed with input from experienced personnel, the system may: identify faults in the system, such as delays at processing facilities or incomplete deliveries; access the stored knowledge base; and identify improvements to the system. For example, a seed piece is repeatedly processed by the same MPE this may delay processing of the seed piece. The system may identify a repeated logging of this MPE for the mail piece and identify a fault.

The system may access the stored knowledge base for an entry related to this repeated logging. The stored knowledge base may return one or more recommended corrections.

Figure 4:
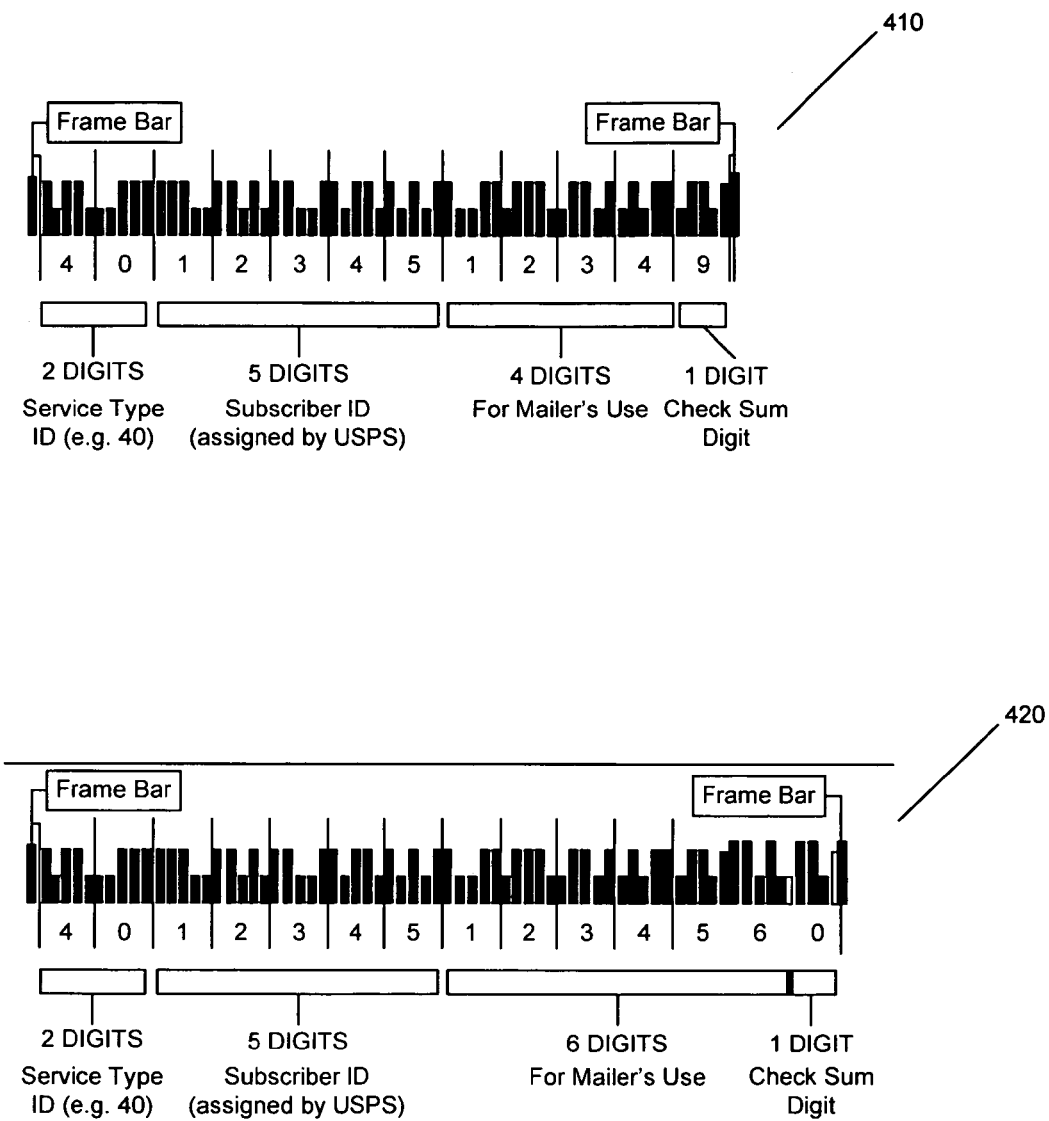
FIG. 4 illustrates 12-digit and 14-digit PLANET™ Codes consistent with the present invention.

FIG. 4 illustrates two exemplary PLANET™ codes consistent with the present invention. PLANET™ code 410 illustrates a 12-digit code containing a two-digit service type, a five-digit subscriber identifier, a four-digit mailer's field, and a one-digit checksum. PLANET™ code 420 illustrates a 14-digit code containing a two-digit service type, a five-digit subscriber identifier, a six-digit mailer's field, and a one-digit checksum. The service type is a code indicating the type of mailing. Service codes may include, for example: "40" First Class Letters; "41" First Class Flats; "42" Standard Letters; "43" Standard Flats; "44" Periodicals Letters; "45" Periodical Flats; "46" First Class Cards; "47" Standard Cards; or "22" Residual Mail. For internal seeding, the subscriber identifier may take the form "99XYY," where "99" identifies the mailing piece as part of a seeding operation, X may be a digit from 0 to 9 indicating a USPS™ geographic area, and YY may be a code from 00 to 99 indicating a P&DC or P&DF within the geographic region.

The Mailing ID is a 4-digit or 6-digit field customized by the seeder to identify a specific mailing or mail piece. Seeders can use these digits any way they choose, such as to identify mail owners or segments of a mailing, measure how well a seeding does in different regions, or compare the effectiveness of different seeding executions. The last digit is a checksum digit or correction character. This digit is the number which, when added to the sum of the other digits in the barcode, results in a number that ends in zero (i.e. a multiple of 10).

Figure 5:
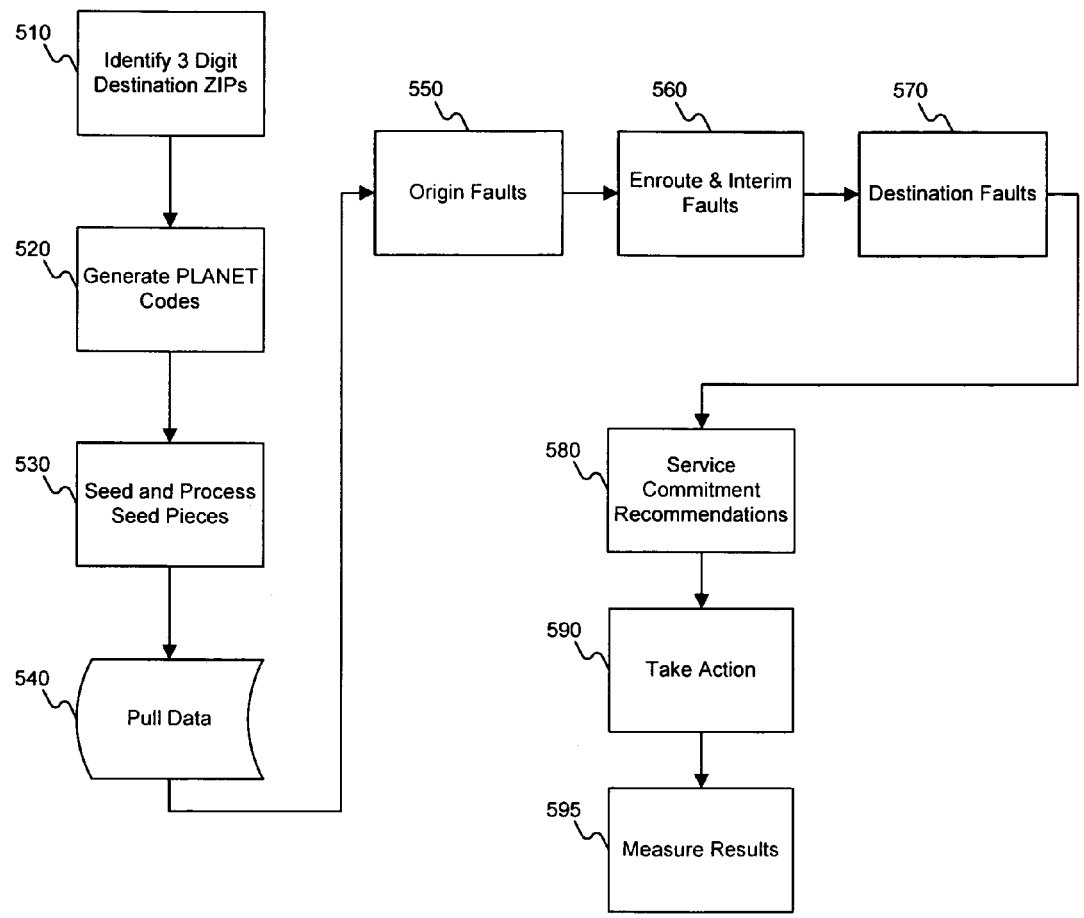
FIG. 5 is a flowchart of the seeding and processing method consistent with the present invention.

FIG. 5 is a flowchart of the tracking and tracing method consistent with the present invention. At stage 510 a mail seeding plan is developed by choosing one or more 3-digit destination ZIP™ codes from an origination plant to respective one or more destination plants. The first three-digits of a ZIP™ code represent targeted geographical destinations that may be serviced by one or more P&DC or P&DF centers. The mail seeding plan may seed mail, for example: from a first plant to a second plant; over a one-day delivery route; over a two day delivery route; over a three day delivery route; from an origin to a destination of an origin/destination pair ("OND pair"); through select facilities based on a need to test systems within the facilities; to one or more destinations within an area; from a first plant to every other plant in the mailing system; from and to a user defined list of pairs; or from an origin to a plurality of destinations based on historical volume.

At stage 520, the system may generate a unique mail identifier, or PLANET™ code, for a given seeding. The plan may designate a period during which these codes will remain unique, for example 30 days. The mail seeding plan may draw the unique mail identifiers from a database that associates a range of unique mail identifiers with each facility. A "live" mail seeding plan may contain a random selection of customer mail including: P.O. Boxes; residential mail; business mail; as well as target addresses for the destination facility. In addition, the mail seeding plan may select a number of seed pieces for each target address, for example, from 1 to 5 seed pieces. A plurality of seeding plans may be generated, with each seeding plan designated to be inducted over a different day. For example, 30 seeding plans may be generated for respective induction on each day of the month. The seeding plans may automatically generate envelopes for seed pieces or mailing labels. Also, seeding names may be generated and associated with the seeding plan.

Figure 6:
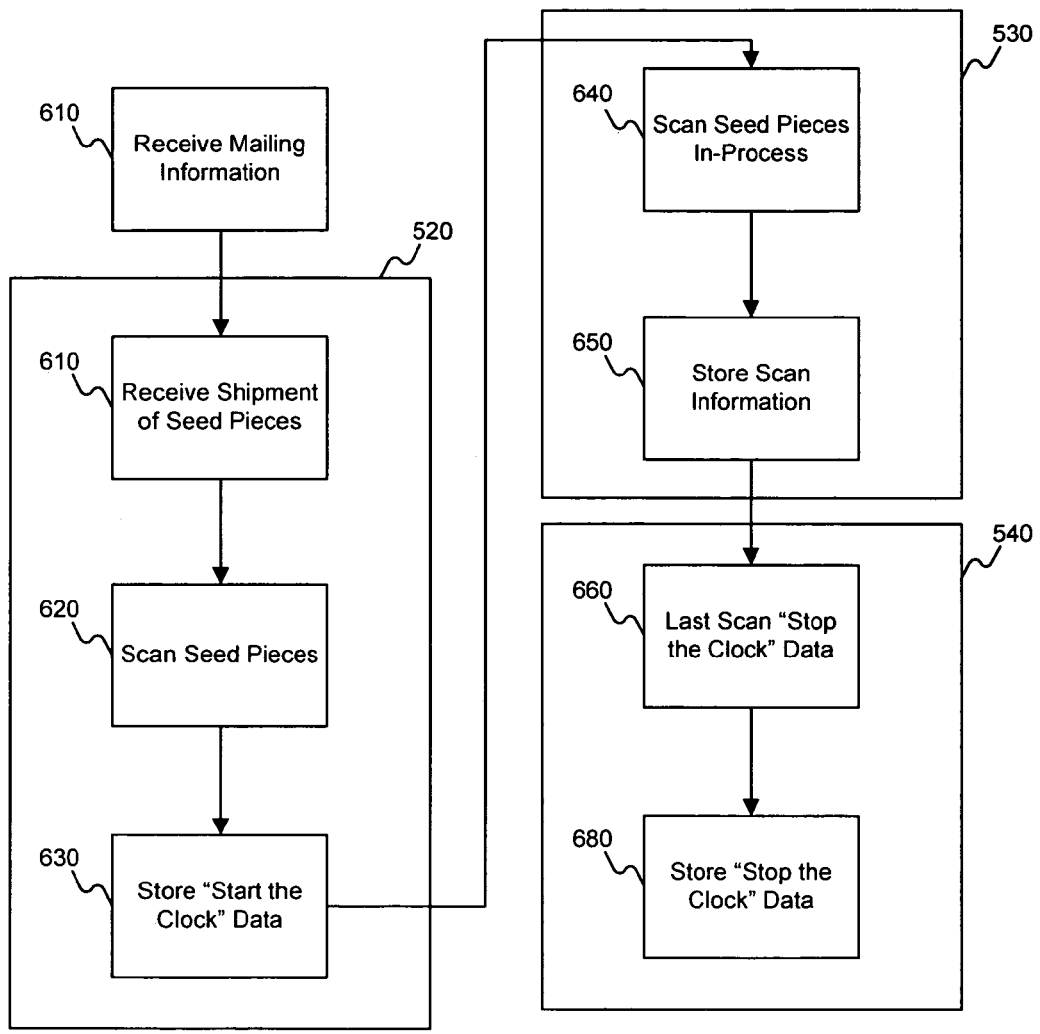
FIG. 6 is a more detailed flowchart of the seeding and processing method consistent with the present invention.

Once the unique mail identifiers are generated at stage 520, stage 530 seeds and processes the mail. As previously described, and will be described in more detail following, seed pieces are inducted and processed through the mail system. FIGS. 6 and 7 more fully describe the seeding and processing stages.

Following seeding and processing of the seed mail at stage 530, stage 540 pulls data from the central repository for analysis. Stages 550, 560, and 570 may diagnose faults within the mailing system that occur, respectively, at the source of origin of the seeding, during interplant processing, and at the destination of the seeding. Stage 580 may make recommendations to improve the system based on the detected faults. At stage 590, operators of the mail system may take one or more of the recommended actions. Once the recommended actions are implemented, further analysis and results may occur at stage 595. For example, a seeding plan may be implemented to determine whether the actions taken resolved or improved upon the problem.

FIG. 6 is a more detailed flowchart of the seeding and processing method consistent with the present invention. At stage 610, the system receives electronic mailing data from the mail processing equipment and stores the information. At this stage, the system may utilize the electronic information for anticipating the upcoming seeding. At stage 610, the system receives the shipment of one or more seed pieces. At stage 620, the mail processing equipment scans the unique mail identifier, e.g., a PLANE™ code. At stage 630, the system stores the scanning and equipment information from the induction scan.

At stage 640, the seed pieces may be scanned in-process. The unique mail identifier may be scanned. At stage 650, the system stores the scanning and equipment information from the induction scan.

At stage 660, the last scan occurs prior to final delivery. At stage 680, final scanning and equipment information may be uploaded and stored.

Figure 7A:
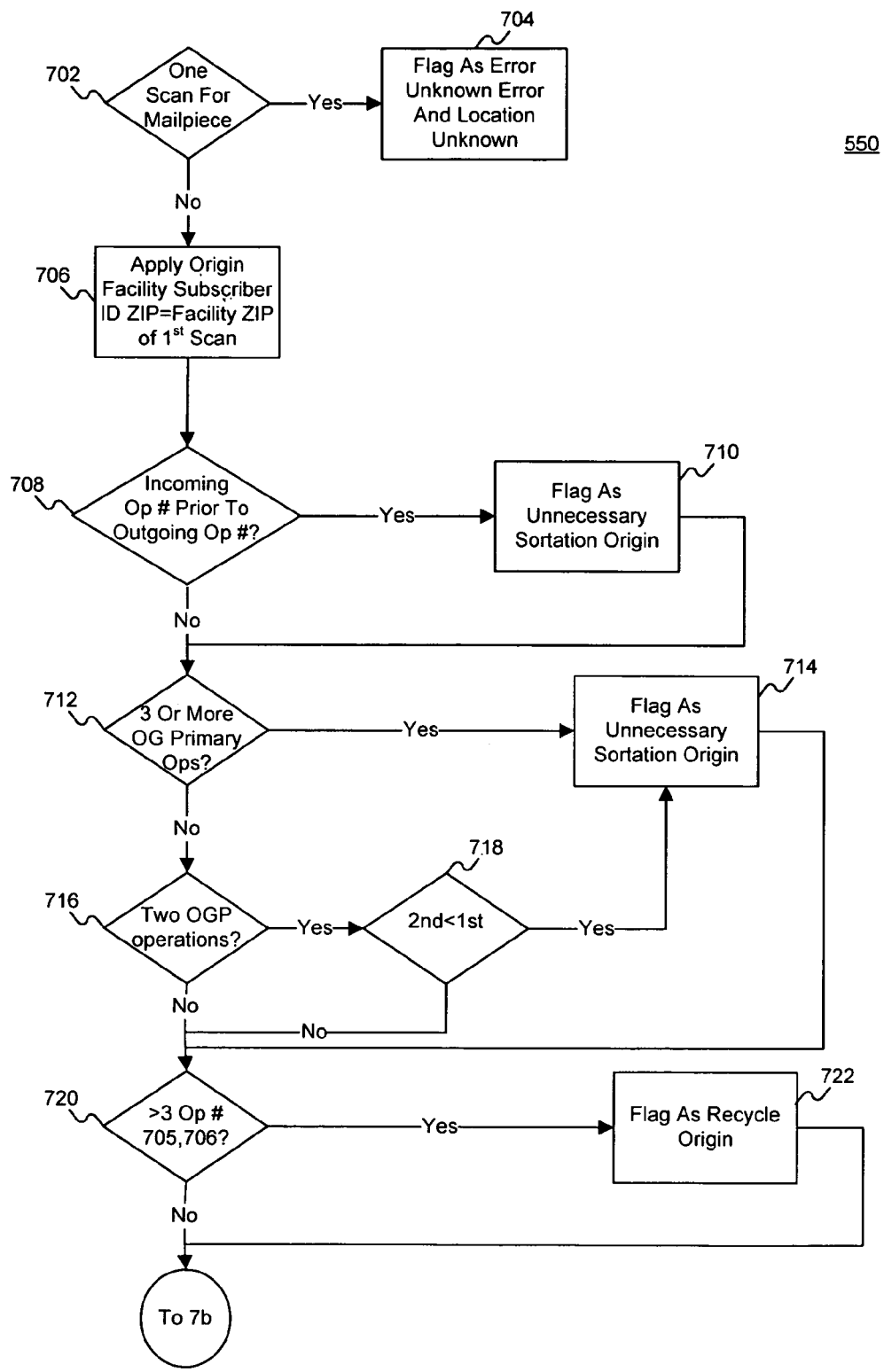
FIGS. 7a and 7b illustrate a flowchart of origin fault analysis consistent with the present invention.
Figure 7B:
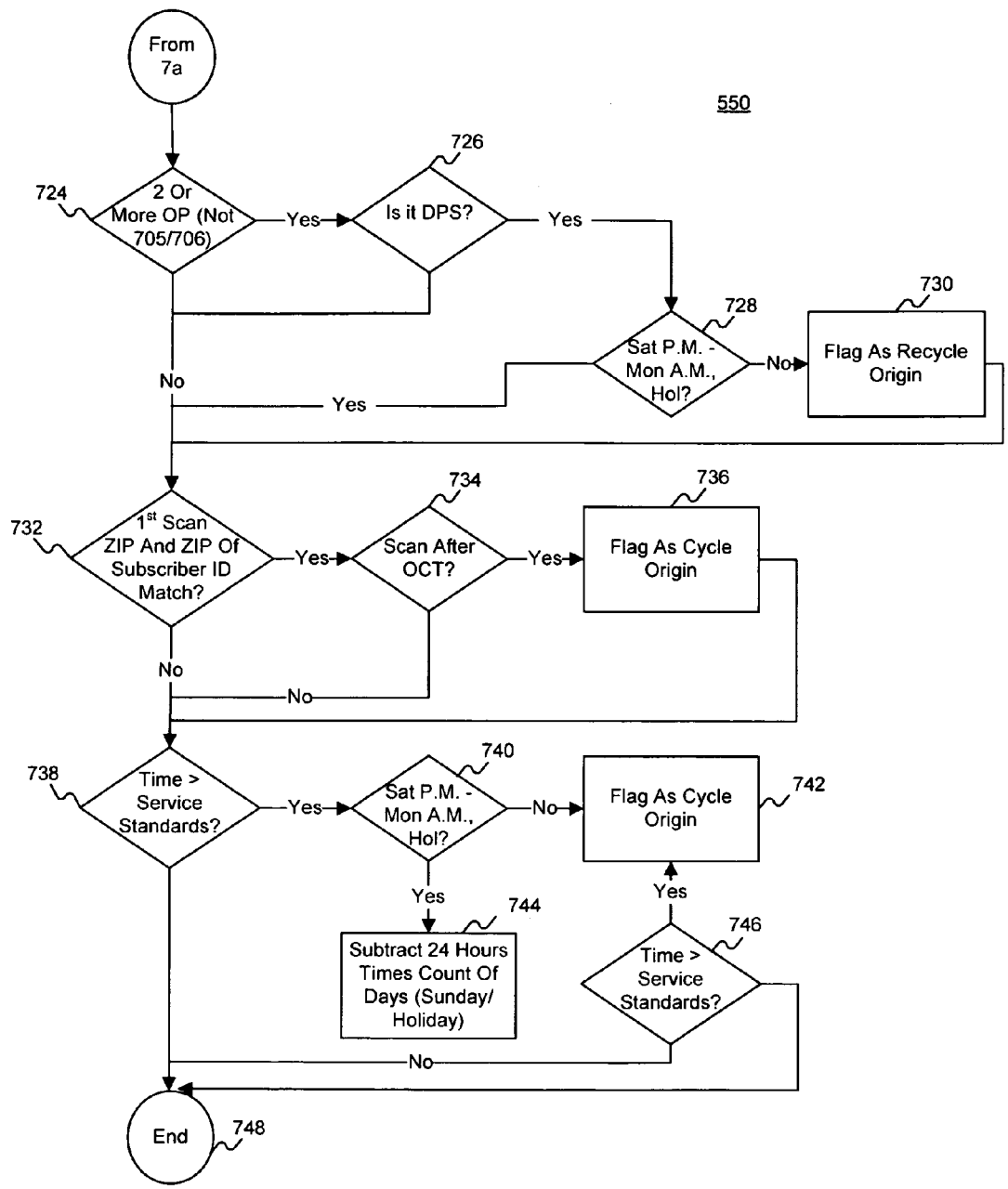

FIGS. 7a and 7b illustrate a flowchart of origin fault analysis 550 (FIG. 5) consistent with the present invention. Prior to the invocation of these stages, the scan data associated with at least one mail seed piece of a seeding operation is retrieved from the central repository. The analysis that follows is for a single seed piece, but may be repeated for each seed piece of a seeding operation. At stage 702, the system determines whether there is only a single scan of a seed piece, indicating that there were an insufficient number of scans for a proper seeding and delivery operation. If so, at stage 704, an error is flagged and no data is used regarding this seed piece.

If there are multiple scans for the seed piece, at stage 706 the origin facility is noted as the facility ZIP™ code of the first scan. At stage 708, the system checks to see whether a scan was registered from incoming mail processing equipment prior to a scan from outgoing mail processing equipment. In proper processing, this condition should not occur. If it does occur, at stage 710, the seed piece is flagged as having been subject to an unnecessary sortation at the origin, Origin Sortation Fault. If not, at stage 712, the system checks whether three or more outgoing mail operations (three or more outgoing MPE scans) occurred on the mail. If so, this too indicates that the seed piece was subject to an unnecessary sortation at the origin, Origin Sortation Fault.

If not, at stage 716, the system checks if two outgoing operations occurred on the seed piece. If the MPE code on the second operation is less than the MPE code on the first operation, this is a fault condition and at stage 714 an Origin Sortation Fault is found. If the MPE code on the second operation is greater than or equal to the MPE code on the first operation, this is proper and a check is made to see if MPE #905 or MPE #906 processed the mail more than three times, if so then an Origin Recycle fault is found. Mail pieces should not be processed on MPE #905 and MPE #906 more than three times at the origination. If more than three MPE #905 or MPE #906 scans occur with a mail piece, the mail was recycled at the origination, thus inducing delays into the mail processing.

At stage 724 (FIG. 7b), the system checks whether there were two or more scans from MPE, except for MPE 705 and MPE 706. If so, and if the seed pieces are delivery point sequencing pieces (DPS), then there is no fault (stage 726). But, if the seed pieces are not DPS and it is not a Saturday afternoon, Sunday, or a holiday (stage 728), then the seed piece has been subject to an Origin Recycle (stage 730). At stage 732, the system checks whether the ZIP™ code of the first scan matches the ZIP™ code of the subscriber identifier. If so, and the scan is after the originating clearance time (stage 734), then the seed piece remained in the originating point for too long and an Origin Cycle fault is found (stage 736).

At stages 738, 740, 744, and 746, the system checks if the seed piece remained at the origination longer than the service standards (stage 738). If the seed pieces were mailed on a Saturday afternoon, Sunday, or a holiday, then additional time is permitted (24 hours per day) (stage 744). If the standard time is still exceeded, an Origin Cycle fault is found (stage 742). At stage 748, the process of searching for faults at the origination location is complete.

Figure 8A:
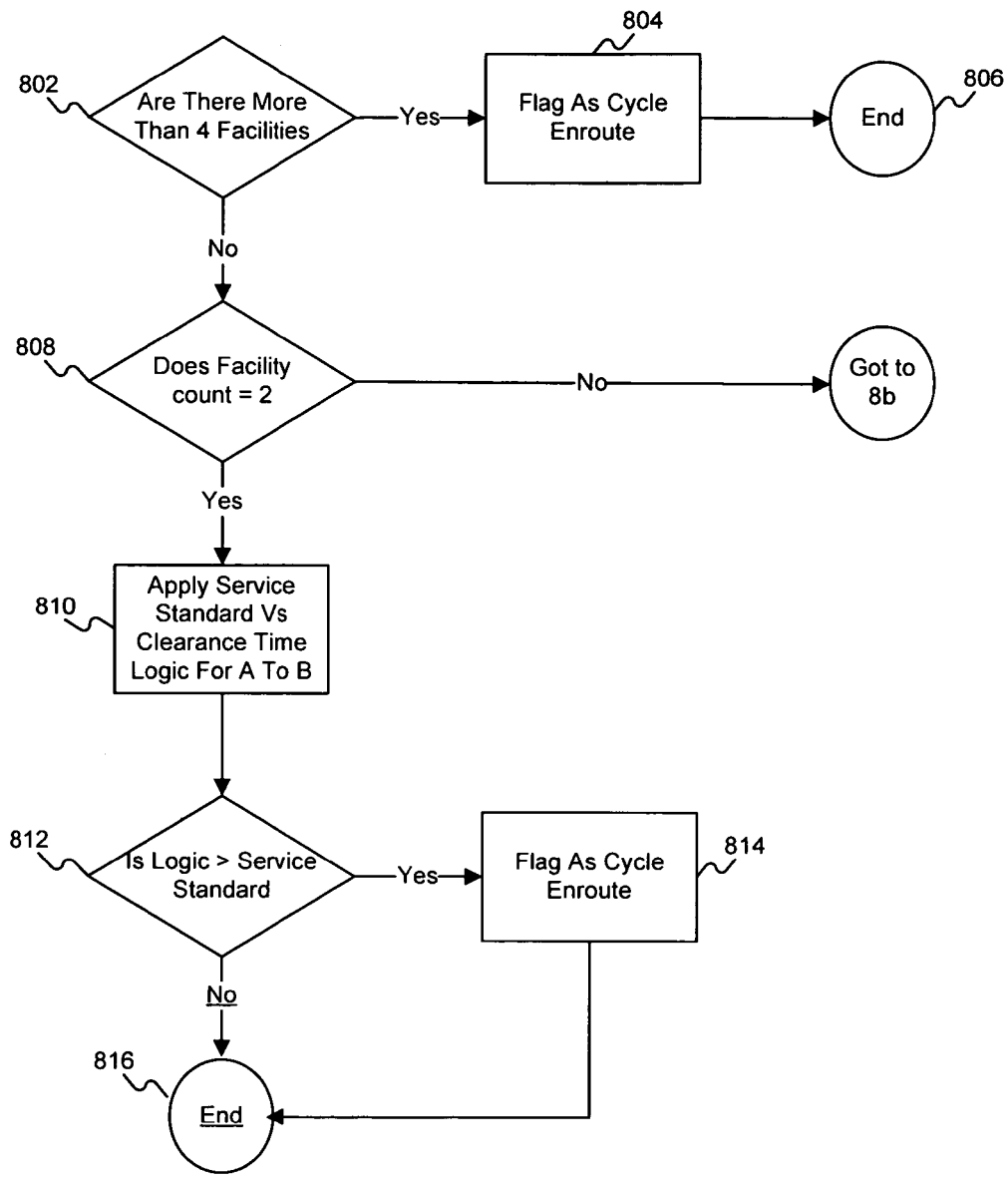
FIGS. 8a, 8b, and 8c illustrate a flowchart of enroute fault analysis consistent with the present invention.
Figure 8B:
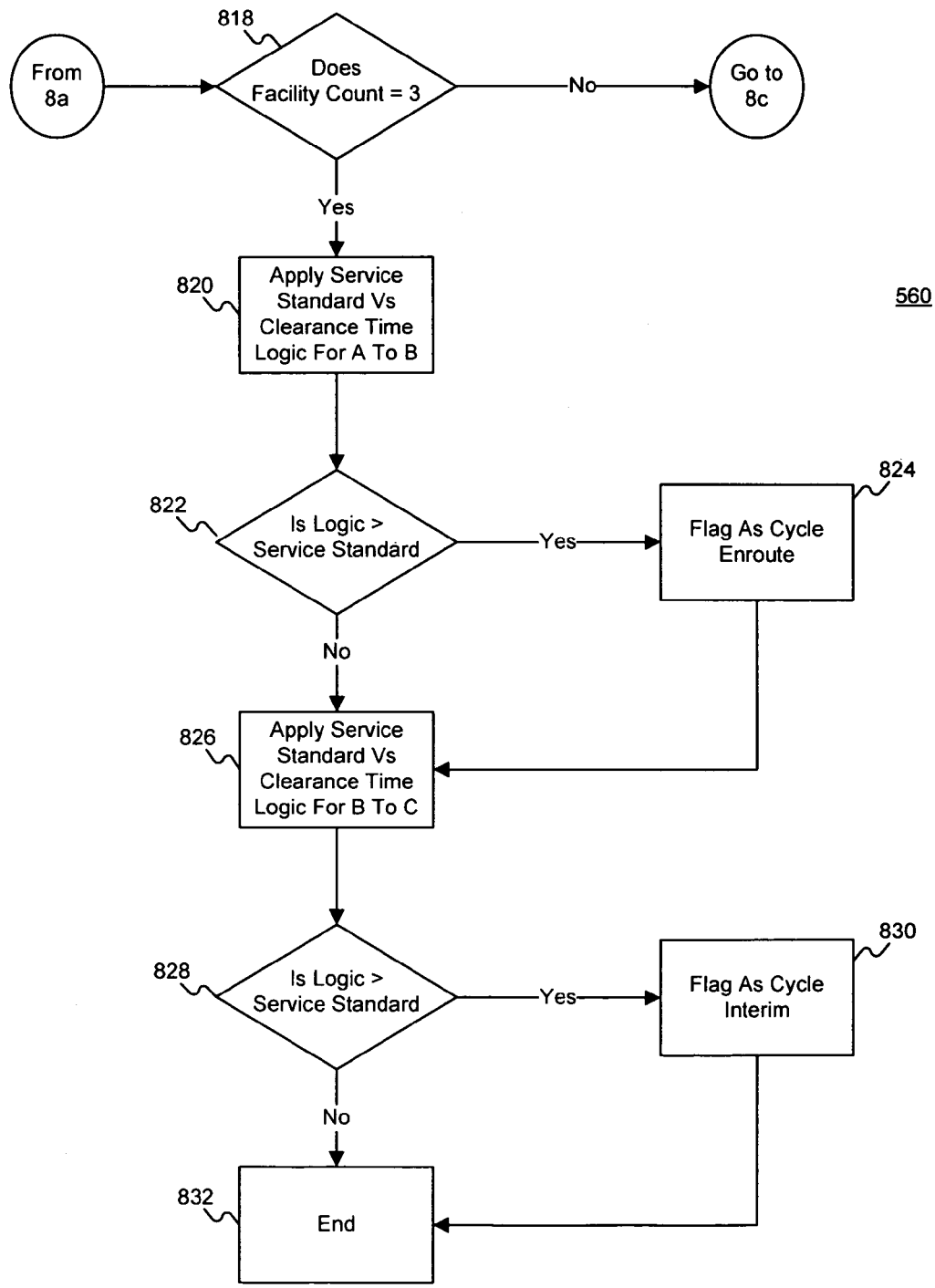
Figure 8C:
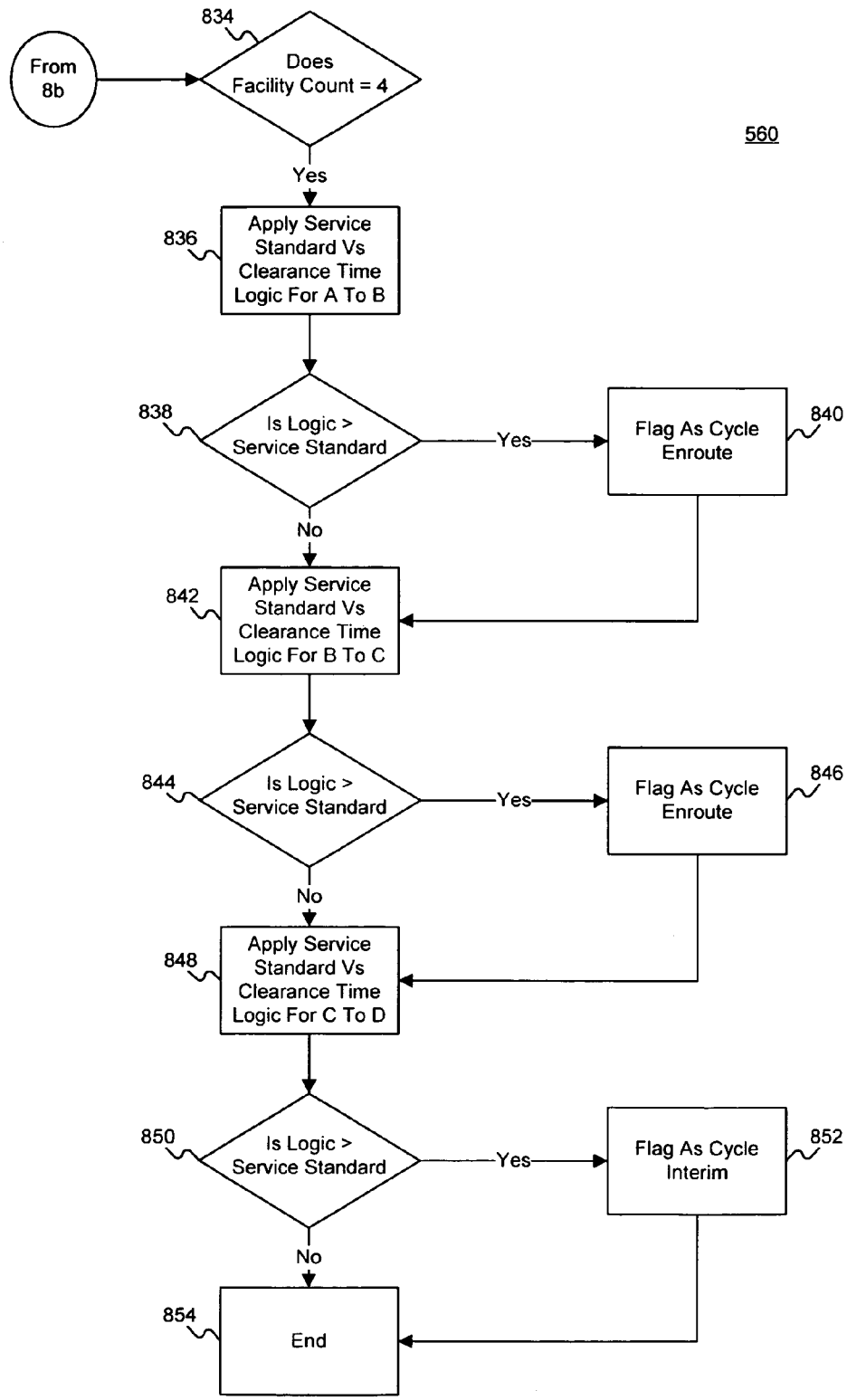

FIGS. 8a and 8b illustrate a flowchart of enroute fault analysis 560 consistent with the present invention. Enroute fault analysis 560 determines if delays occurred during the enroute transport of a seed piece and finds the source of the delays. If more than four facilities are involved in the routing of the seed piece, as denoted by scans from more than four facilities, the seed piece triggers an Enroute Cycle fault (stages 802,804). If the number of facilities is two (stage 808), then the service standards (standards established to determine how long it should take for a piece of mail to get from point A to point B) are applied to determine if the calculated time from the first facility, A, to the second facility, B, is longer than the service standard (stage 812). If so, an Enroute Cycle fault is found (stage 814).

A facility count of three denotes that an interim facility was involved in the routing. For example, a seed piece may go from Atlanta to Jacksonville to Daytona Beach. If the facility count is three, i.e., the seed piece went from A to B to C, the system determines the service time from A to B (stage 820). If the calculated time from A to B was longer than the service standard, then the seed piece experienced an Enroute Cycle fault (stage 824). The system then determines the service standard from B to C (stage 826). If the calculated time from B to C was longer than the service standard (stage 828), then the seed piece experienced an Interim Cycle fault (stage 830).

A facility count of four denotes that two interim facilities were involved in the routing. For example, a seed piece may go from Atlanta to Jacksonville to Daytona Beach to Ormond Beach. If the facility count is four, i.e., the seed piece went from A to B to C to D, the system determines the service time from A to B (stage 836). If the calculated time from A to B was longer than the service standard, then the seed piece experienced an Enroute Cycle fault (stage 840). The system then determines the service standard from B to C (stage 842). If the calculated time from B to C was longer than the service standard (stage 844), then the seed piece experienced an Interim Cycle fault (stage 846). The system then determines the service standard from C to D (stage 848). If the calculated time from C to D was longer than the service standard (stage 850), then the seed piece experienced an Interim Cycle fault (stage 852).

Figure 9A:
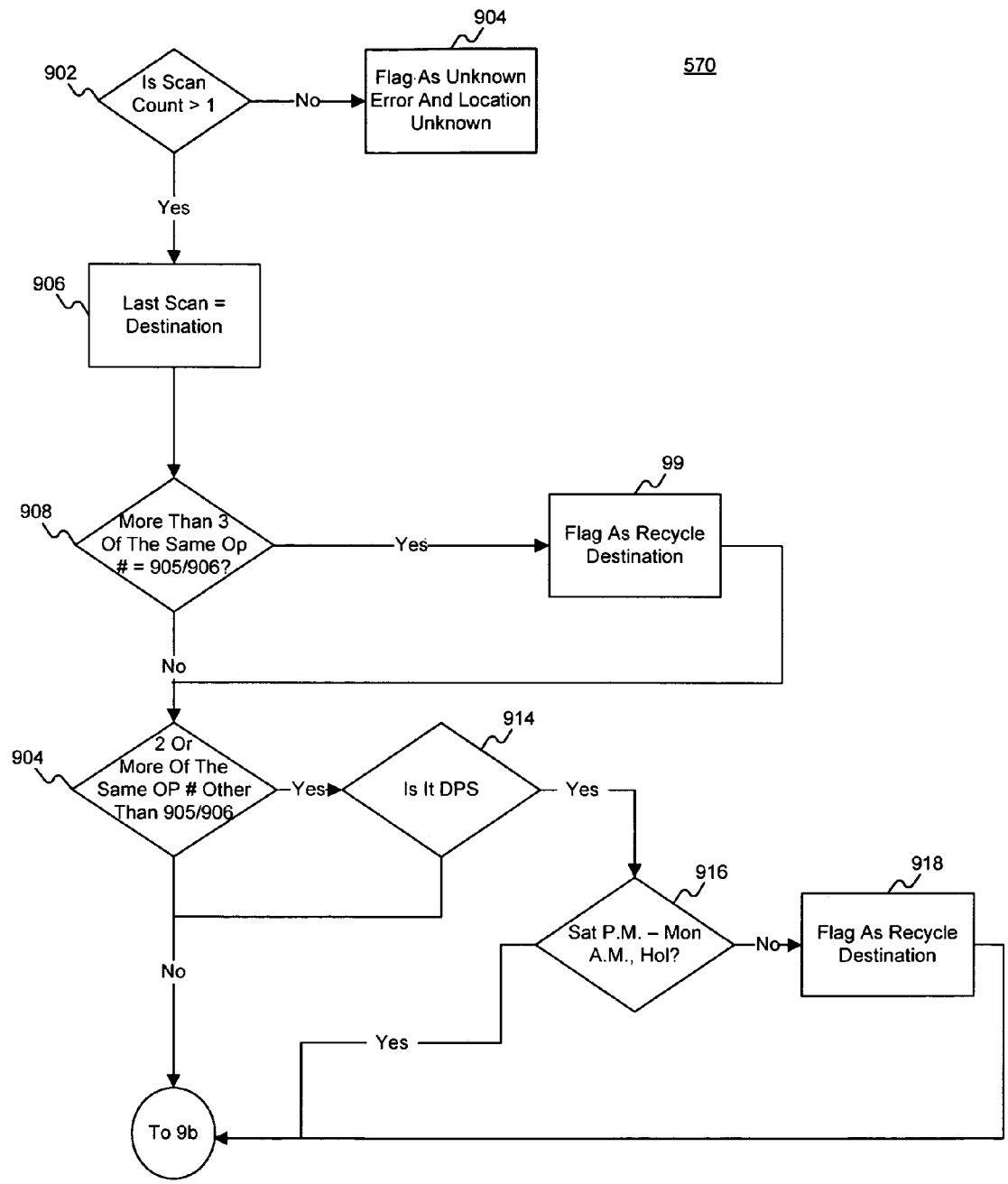
FIGS. 9a and 9b illustrate a flowchart of destination fault analysis 770 consistent with the present invention.
Figure 9B:
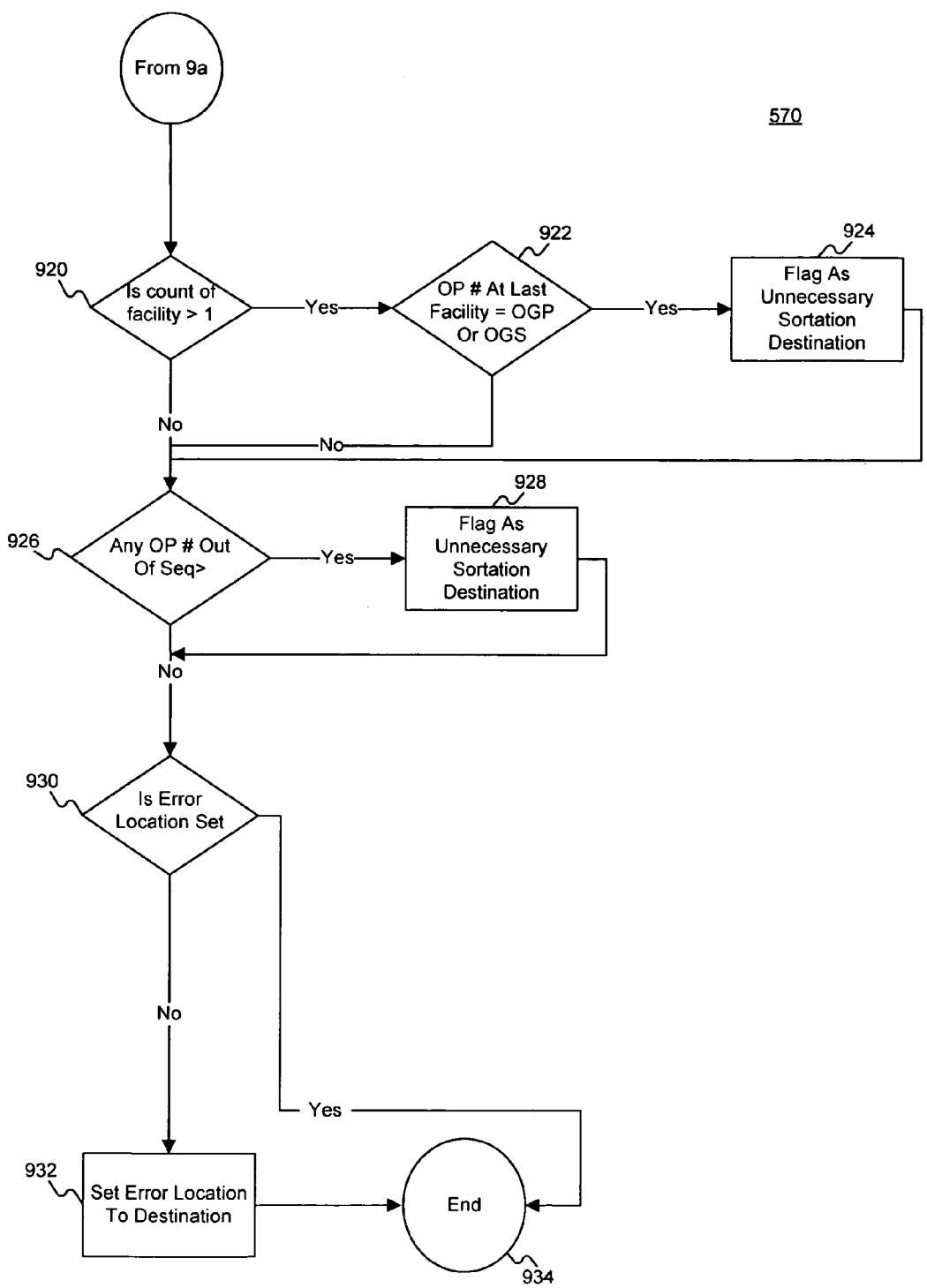

FIGS. 9a and 9b illustrate a flowchart of destination fault analysis 570 consistent with the present invention. The system determines whether there is only a single scan of a seed piece, indicating that there were an insufficient number of scans for a proper seeding and delivery operation (902). If so, an error is flagged and no data is used regarding this seed piece (904). If multiple scans are found, the last scan is determined to be the destination or "Stop the Clock" scan. If three or more MPE #905 or MPE #906 are scanned (stage 908), the seed piece has been overprocessed and a Destination Recycle Fault is found (stage 912). If two or more of the same MPE operation numbers, other than MPE #905 and MPE #906, are found (stage 910) and the seed piece is DPS (stage 914) and it is not over a Saturday afternoon, Sunday, or a holiday (stage 916), then a Destination Recycle Fault is found (stage 918).

If more than one facility was involved in the transfer of the seed piece, i.e. it was not an intrafacility seeding, (stage 920) and the MPE operation number at the last facility, or last scan, is an OGP or OGS (stage 922) then an unnecessary sortation occurred. Therefore, a Destination Sortation fault is found (stage 924). If an operation number from an MPE is out of sequence (stage 926), then a Destination Sortation fault is found (Stage 928). Any faults found are associated with the Destination location (stages 930, 932, 934).

Figure 10:
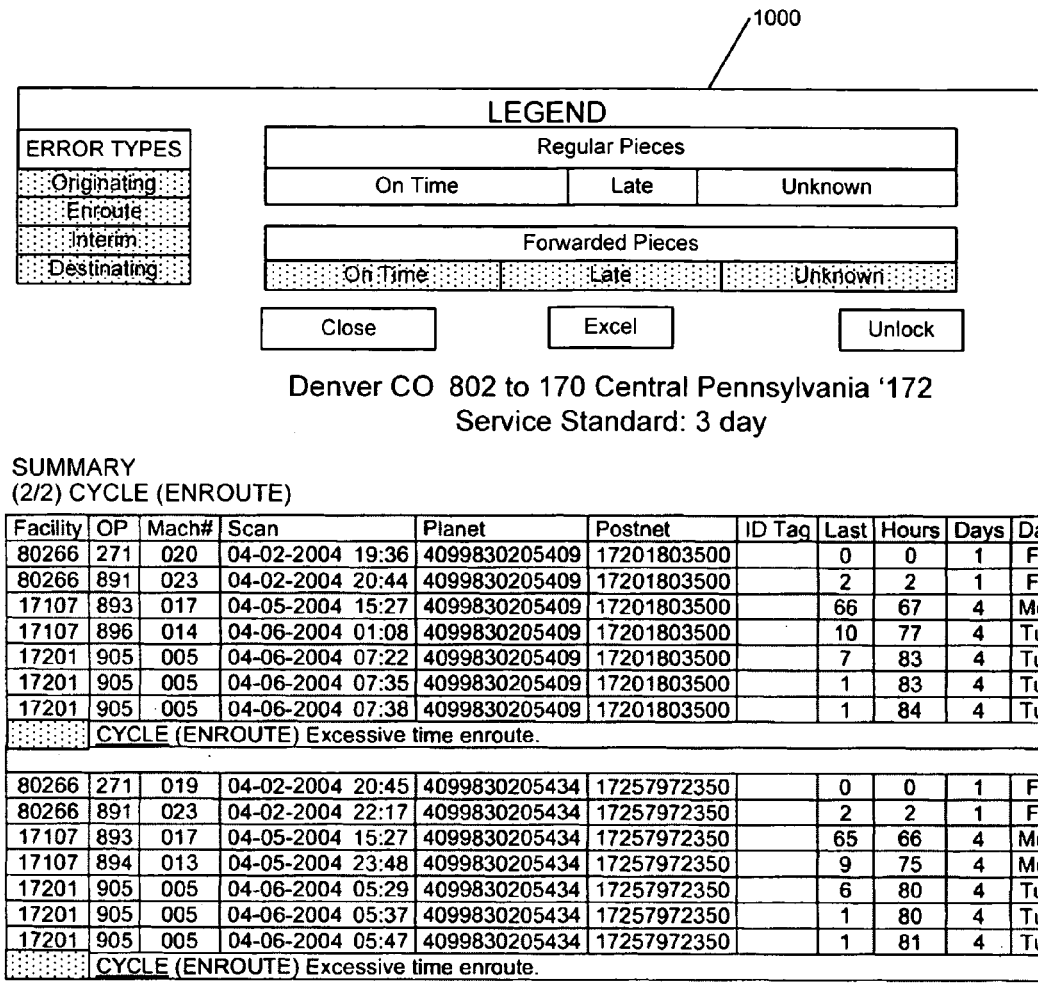
FIG. 10 illustrates a grid report consistent with the present invention.

As previously described, various reports may be generated based on the uploaded scans of the seed pieces and the fault analysis. For example, FIG. 10 illustrates a grid report 1000 that may be generated by the system to provide a listing of scans for one or more seed pieces. The grid report may be color coded or gray scaled to indicate seed pieces the nature of the fault for a seed piece. The report may provide a row of data for each scan upload. The rows may provide, for example: the facility number in which the scan occurred; the operation code of the MPE that performed the scan; the machine number of the MPE that performed the scan; the scan date and time; the PLANET™ code of the seed piece scanned; the POSTNET™ code of the seed piece scanned; any ID tag of the seed piece scanned; and an elapsed time from the "Start the Clock" scan.

The illustrated grid report 1000 indicates data for two seed pieces. Both of these seed pieces were part of a seeding from Denver facility "802" to Central Pennsylvania facility "172." The seed piece went through three facilities: 80266; 17107; and 17201. In other words, it went from the Denver "802" facility, through an intermediate "171" facility; and to the Central Pennsylvania "172" facility. The seed piece had a PLANET™ code of "4099830205409," indicating a first class mail, seed piece from geography area 8 (Western Area), facility 30 (Denver P&DC). Looking at the elapsed time, it can be seen that the seed piece spent an excessive amount of time after operation 891 at facility 80266 prior to being processed at 17107 on operation 893 at machine 017. The system noted this in the report as an Enroute Cycle failure.

Summary reports for a seeding are another exemplary report. FIG. 11 illustrates a summary report 1100 consistent with the present invention. This report may illustrate results from a seeding from an origination facility to a destination facility. The report may be expanded by selecting facilities or geographic regions and viewing the results from internal facilities. For example, summary report 1100 indicates that the Harrisburg geographic area had 24 total seed pieces sent to Harrisburg. Fourteen pieces were delivered on-time, with ten seed pieces failing service commitment. There were 17 total errors for Harrisburg, including 8 errors at the origin plant, 2 errors enroute, 3 errors interim, and 3 errors at destination.

As mentioned, Harrisburg can be expanded to reveal results from the two three-digit ZIP™ codes, 171 and 172, serviced within the Harrisburg Cluster. A user can also view the grid report by selecting the appropriate linked number in the error analysis portion of the summary report. Thus, users can tunnel down into reports to view problem locations.

While the reporting features provide an analysis of the failures, the system may also provide recommendations based on the type of failure. Faults can be within a facility or between facilities. Faults within a facility may include: cycle faults—where there is excessive time between scans; recycle faults—where there is repetition of machine numbers; and unnecessary sortation faults—caused by unnecessary human intervention. Faults enroute may be surface faults or air transport faults.

One or more recommendations may be made for each type of fault. For example, a cycle fault within a facility may prompt one or more of the following recommendations:
Check the sort end time and compare against the clearance time;
Check for excessive jams, overlength errors, read rejects, gap errors, skew errors, bin fulls, and emergency stops;
Check for too many out-of-sequence errors;
A bad sort plan; or mis-sorted trays;
Clearance time or critical entry time problems;
Poor management decisions;
Mis-sent trays of mail;
Mishandling;
Sweeper errors;
Dispatch discipline issues;
Rebuild or Regenerate sort plans; or
Change sort plans.

These are merely exemplary. Other errors and recommendations of solutions may be implemented.

Although primary access to the system is through the delivery system's intranet, those skilled in the art will appreciate that all or part of systems and methods consistent with the present invention may be stored on or read from other computer-readable media, such as: secondary storage devices, like hard disks, floppy disks, and CD-ROM; a carrier wave received from the Internet; or other forms of computer-readable memory, such as read-only memory (ROM) or random-access memory (RAM).

Furthermore, one skilled in the art will also realize that the processes illustrated in this description may be implemented in a variety of ways and include multiple other modules, programs, applications, scripts, processes, threads, or code sections that all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed just for this purpose.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of analyzing the operation of a delivery system, comprising:
   determining a seeding plan;
   placing a seed piece into the delivery system;
   tracking the seed piece through the delivery system to generate tracking data;
   storing the tracking data in a central repository;
   analyzing the tracking data to determine one or more faults; and
   providing one or more recommendations to improve the operation of the delivery system based on the faults.

2. The method of claim 1, further comprising:
   implementing the recommendations; and
   following implementing, performing the placing, tracking, storing, and analyzing stages.

3. The method of claim 1, wherein analyzing further comprises analyzing the tracking data for sortation faults.

4. The method of claim 1, wherein analyzing further comprises analyzing the tracking data for cycle faults.

5. The method of claim 1, wherein analyzing further comprises analyzing the tracking data for recycle faults.

6. The method of claim 1, wherein the seed piece travels through two or more facilities, and the method further comprises analyzing the tracking data for enroute cycle faults.

7. The method of claim 6, further comprising analyzing the tracking data for interim cycle faults.

8. A system for analyzing the operation of a delivery system, comprising:
   a memory;
   a database;
   a processor coupled to the memory and the database, the processor configured to:
   determine a seeding plan;
   place a seed piece into the delivery system;
   track the seed piece through the delivery system to generate tracking data;
   store the tracking data in a central repository; and
   analyze the tracking data to determine one or more faults;
   wherein the processor is further operable to provide one or more recommendations to improve the operation of the delivery system based on the faults.

9. The system of claim 8, wherein the processor is further operable to:
   implement the recommendations; and
   repeat the placing, tracking, storing, and analyzing processor operations.

10. The system of claim 8, wherein the processor is further operable to analyze the tracking data for sortation faults.

11. The system of claim 8, wherein the processor is further operable to analyze the tracking data for cycle faults.

12. The system of claim 8, wherein the processor is further operable to analyze the tracking data for recycle faults.

13. The system of claim 8, wherein the seed piece travels through two or more facilities, and the processor is further operable to analyze the tracking data for enroute cycle faults.

14. The system of claim 13, wherein the processor is further operable to analyze the tracking data for interim cycle faults.

15. A computer-readable medium on which is stored:
   a set of instructions for analyzing the operation of a delivery system, which when executed perform stages comprising:
   determining a seeding plan;
   placing a seed piece into the delivery system;
   tracking the seed piece through the delivery system to generate tracking data;
   storing the tracking data in a central repository; and
   analyzing the tracking data to determine one or more faults; and
   a set of instructions for providing one or more recommendations to improve the operation of the delivery system based on the faults.

16. The computer-readable medium of claim 15, further comprising instructions for
   implementing the recommendations; and
   following implementing the recommendations, performing the placing, tracking, storing, and analyzing stages.

17. The computer-readable medium of claim 15, further comprising instructions for analyzing the tracking data for sortation faults.

18. The computer-readable medium of claim 15, further comprising instructions for analyzing the tracking data for cycle faults.

19. The computer-readable medium of claim 15, further comprising instructions for analyzing the tracking data for recycle faults.

20. The computer-readable medium of claim 15, further comprising instructions for analyzing the tracking data for en route cycle faults.

21. The computer-readable medium of claim 15, further comprising instructions for analyzing the tracking data for interim cycle faults.

* * * * *